(12) United States Patent
Depondt (10) Patent No.: US 10,077,024 B2
(45) Date of Patent: Sep. 18, 2018

(54) WIPER BLADE DEVICE (71) Applicant: Robert Bosch GmbH, Stuttgart (DE)

(72) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 767 days.

(21) Appl. No.: 14/395,582

(22) PCT Filed: Apr. 9, 2013

(86) PCT No.: PCT/EP2013/057349
§ 371 (c)(1),
(2) Date: Oct. 20, 2014

(87) PCT Pub. No.: WO2013/156340
PCT Pub. Date: Oct. 24, 2013

(65) Prior Publication Data
US 2015/0082577 A1    Mar. 26, 2015

(30) Foreign Application Priority Data

Apr. 19, 2012 (DE) .......................... 10 2012 206 423

(51) Int. Cl.
*B60S 1/40* (2006.01)
*B60S 1/38* (2006.01)
(52) U.S. Cl.
CPC ............ *B60S 1/3853* (2013.01); *B60S 1/387* (2013.01); *B60S 1/3849* (2013.01);
(Continued)

(58) Field of Classification Search
CPC .... B60S 1/3849; B60S 1/3851; B60S 1/3853; B60S 1/3858; B60S 1/4045; B60S 1/4077;
(Continued)

(56) References Cited

U.S. PATENT DOCUMENTS 2,432,693 A * 12/1947 Anderson ............. B60S 1/4003
15/250.32
2,548,090 A * 4/1951 Anderson ............. B60S 1/3801
15/250.32
(Continued)

FOREIGN PATENT DOCUMENTS

CN        2671853 Y      1/2005
DE     102009014700     10/2009
(Continued)

OTHER PUBLICATIONS

International Search Report for Application No. PCT/EP2013/057349 dated May 31, 2013 (English Translation, 4 pages).

*Primary Examiner* — Gary Graham
(74) *Attorney, Agent, or Firm* — Michael Best & Friedrich LLP (57) ABSTRACT

The invention relates to a wiper blade device (10*a-f*) comprising a base unit (12*a-f*) and an adapter unit (14*a-f*), which can be connected to a wiper arm and is fixed to the base unit (12*a-f*) in a form-fitting manner in at least one mounted state, wherein the base unit (12*a-f*) and the adapter unit (14*a-f*) have a form-fit connection in the mounted state, in which at least one of the units surrounds the other of the units, at least in part, in a form-fitting manner.

17 Claims, 5 Drawing Sheets (52) U.S. Cl.
CPC ........... *B60S 1/3851* (2013.01); *B60S 1/3868* (2013.01); *B60S 1/381* (2013.01); *B60S 1/3879* (2013.01); *Y10T 29/49826* (2015.01); *Y10T 403/60* (2015.01); *Y10T 403/608* (2015.01)

(58) Field of Classification Search
CPC ............ Y10T 29/49826; Y10T 403/60; Y10T 403/602; Y10T 403/608
USPC ...................................................... 15/250.32
See application file for complete search history.

(56) References Cited

U.S. PATENT DOCUMENTS

| | | | | |
|---|---|---|---|---|
| 2,756,454 | A | * | 7/1956 | Nesson ................. B60S 1/4003 15/250.32 |
| 3,823,436 | A | * | 7/1974 | Roberts ..................... B60S 1/40 15/250.32 |
| 2007/0094833 | A1 | | 5/2007 | Poton |
| 2008/0163448 | A1 | | 7/2008 | Yang et al. |
| 2012/0317741 | A1 | * | 12/2012 | Benner ................. B60S 1/3858 15/250.32 |

FOREIGN PATENT DOCUMENTS

| | | | |
|---|---|---|---|
| EP | 2020351 | | 2/2009 |
| FR | 2879986 | | 6/2006 |
| FR | 2916715 | | 12/2008 |
| FR | 2924080 | | 5/2009 |
| JP | 2009154771 | * | 7/2009 |
| WO | 2012033365 | | 3/2012 |

* cited by examiner

WIPER BLADE DEVICE

BACKGROUND OF THE INVENTION

Wiper blade devices comprising a base unit and an adapter unit, which can be connected to a wiper arm and is fixed to the base unit in a form-fitting manner in at least one mounted state, are already known from the prior art.

SUMMARY OF THE INVENTION

The invention relates to a wiper blade device comprising a base unit and an adapter unit, which can be connected to a wiper arm and is fixed to the base unit in a form-fitting manner in at least one mounted state, wherein the base unit and the adapter unit have a form-fit connection in the mounted state, in which at least one of the units surrounds the other of the units, at least in part, in a form-fitting manner. A "base unit" refers in this context particularly to a unit which provides a foundation for the adapter unit and is fastened to a spring strip of a wiper blade in at least one mounted state. A "spring strip" refers in this context particularly to an element which has at least one extension which, in a normal operating state, can be elastically changed by at least 10%, in particular by at least 20%, preferably by at least 30% and especially advantageously by at least 50% and which element generates a counter force that is dependent on the change in the extension and acts against said change. An "extension" of an element is to be understood in this context particularly as a maximum distance between two points of a vertical projection of the element onto a plane. The spring strip is made in part, preferably to a large extent and particularly advantageously completely, out of spring steel. By the fact that the spring strip consists "at least to a large extent" of spring steel, it is particularly to be understood that the spring strip has a spring steel content of at least 50%, in particular of at least 70%, preferably of at least 90% and especially advantageously of at least 95% by weight.

The base unit is preferably designed as a single piece. "Single piece" refers especially to being connected at least in a materially bonded manner, for example by means of a welding process, an adhesive bonding process, a molding process and/or another process that appears to be useful to a person skilled in the art, and/or to be advantageously formed in one piece, such as, for example by a production from a cast and/or by a production in a single- or multi-component injection molding process and particularly advantageously from a single blank. An "adapter unit" is to be understood in this context particularly as a unit which has a contact region for a wiper blade component, in particular the base unit, which is undetachably connected to the wiper blade component in particular in at least one mounted state and which is provided to furnish a coupling region of a wiper blade for coupling and/or contacting to the wiper arm, in particular to a wiper arm adapter of the wiper arm. The term "provided" is particularly to be understood as specially designed and/or equipped. The adapter unit is preferably rotatably connected to the wiper arm, in particular to the wiper arm adapter of the wiper arm, also in particular indirectly via at least one bearing element. The base unit and/or the adapter unit preferably consist at least substantially of plastic; said units can however also, in principle, be manufactured from a metal or another material which is considered suitable by a person skilled in the art. By the base unit and/or the adapter unit "consisting at least substantially of plastic" refers to the fact that the base unit and/or the adapter unit has a plastic content of at least 60%, in particular of at least 70%, preferably of at least 80% and especially advantageously of at least 90% by weight. The adapter unit is preferably formed in one piece. Said adapter unit can however, in principle, be manufactured from a plurality of separately manufactured individual parts that are connected to one another. By the term "form-fitting manner", it is particularly to be understood that the base unit and the adapter unit have a few abutting surfaces which exert a holding force on each other in the normal direction of the surfaces. When adjoining one another in a form-fitting manner, the base unit and the adapter unit are, in particular, situated in a geometric engagement with one another. By "surrounding one another at least in part", it is to be understood that at least one section of the base unit or the adapter unit is covered on at least two sides by abutting sections of the adapter unit or the base unit. One of the units preferably surrounds the other unit from above, which is to be understood to mean that the one unit covers at least one subarea of the other unit on a side of the other unit that faces away from a surface of the wiper blade. An attachment of a wiper arm to a wiper blade which is easily performed and reliable can thus, in particular, be achieved.

According to the invention, the adapter unit furthermore comprises a form-fit element which is surrounded at least in part by the base unit in the mounted state. A "form-fit element" refers particularly to an element of the adapter unit that is especially provided for an engagement with another element. The form-fit element is preferably designed as a projection of the adapter unit. An attachment of the adapter unit to the base unit which is easily performed can, in particular, be achieved.

According to the invention, the form-fit element of the adapter unit is designed to be at least partially rounded. By "designed to be at least partially rounded", it is particularly to be understood that the form-fit element has at least one subarea which has outer surfaces and a rounded configuration. The at least partially rounded form-fit element preferably protrudes beyond other subareas of the adapter unit. The partially rounded form-fit element can particularly have a semicircular cross section. The subarea of rounded configuration is furthermore preferably arched-shaped. An adapter unit which is easily attached can thus be achieved.

According to the invention, the base unit further comprises at least one detent element which is provided to fix the adapter unit by means of a detent connection. A "detent element" refers in this context particularly to an element for establishing a detent connection, which is preferably provided to be elastically deflected during a mounting operation. An attachment which is reliable and easy to service can thus particularly be achieved.

According to the invention, the adapter unit further comprises at least one rounded pin which is provided for the abutment of a detent element. A pencil-shaped element is particularly to be understood by a "rounded pin", which is at least configured having a rectangular cross section that has rounded edges or preferably having a circular cross section. In so doing, a simple snap-on mounting of the adapter unit can especially be achieved.

According to the invention, the detent element is furthermore formed by a detent hook. A "detent hook" refers here to a hook-shaped element which is provided to achieve a detent connection. By the term "hook-shaped element", an element is to be understood which has a recess for providing an abutment surface for an abutment element, said recess being delimited in at least one direction by more than 180 degrees by the walls of the hook-shaped element. The recess is preferably designed in a curved manner. In principle, said recess can also however have an angular design, for example by means of a polygon profile. As a result, a detent element of the base unit which is simple to manufacture can particularly be achieved.

According to the invention, the detent hook is rotatably mounted. A rotatable mounting could, for example, be achieved by mounting the detent hook on a rotatably mounted bar. In principle, other rotatable mountings that appear suitable to the person skilled in the art are however also possible. Thus, a snap-on mounting which is of simple design and which can be implemented in an uncomplicated manner as well as a simple detachability of the snap-on mounting can be achieved.

According to the invention, the detent hook is furthermore held in a closed state by means of an elastic element. An "elastic element" is particularly to be understood as an element which can be repeatedly elastically deformed and/or deflected without the element thereby being mechanically damaged or destroyed and which independently seeks to assume a basic shape and/or basic orientation after being deformed and/or deflected. A reliable detent connection and a firm fixation of the adapter unit in the base unit can thus particularly be achieved.

According to the invention, the detent element is designed to be elastically deformable. An "elastically deformable" element is to be understood as an element which can be repeatedly deformed without said element thereby being mechanically damaged or destroyed and which, in particular, independently seeks to again assume a basic shape after being deformed. In particular, the elastically deformable element can be elastically deflected due to an elastic deformation thereof, which is understood to mean that said element at least substantially retains an external form as a result of an external force, is however displaced in position with respect to further elements. Hence, a detent element of simple design can particularly be achieved.

According to the invention, the detent element is wedge-shaped. By the term "wedge-shaped", a detent element is particularly to be understood which has a basic shape in which at least two sides converge at an angle that is smaller than a right angle. The two sides preferably converge at an angle of 45 degrees. A detent element having a simple configuration can thus especially be achieved.

According to the invention, the adapter unit furthermore has at least one folding element which is provided for attaching a wiper arm to the adapter unit. A "folding element" refers particularly to an element which is provided to be pivoted about a stationary axis. In particular, an attachment element that is simple to manipulate can thus be achieved for the purpose of attaching a wiper arm.

The invention furthermore proposes an orientation element. An orientation element refers particularly to an element which is provided to give a user an indication of an orientation of the base unit and the adapter unit with respect to one another during mounting. The likelihood of the wiper blade device being mounted improperly is thereby reduced.

The invention furthermore proposes that the orientation element be designed as a visual reference element. A "visual reference element" is particularly to be understood as an element that is provided to give a user an optical clue and to serve no further function, for example for producing a connection. The visual reference element can be configured as a decorative recess, preferably as an eyelet, or as a reference plate comprising a drawing and/or lettering. It is therefore less likely for the base unit to be improperly mounted to the adapter unit.

The invention furthermore proposes that that the orientation element be designed as a form-fit element of the base unit and/or the adapter unit. An indication of the orientation of the base unit and the adapter unit with respect to one another can especially be provided during mounting via a direction of extension of the form-fit element. If the form-fit element is designed at least partially round, the indication of the orientation can be provided via a direction of extension of a rounded portion. A functional integration of attachment elements with an additional function can thereby be particularly achieved and the likelihood of an improper mounting can be reduced as well.

The invention furthermore proposes that the base unit comprises a receiving area for the adapter unit that is delimited by at least two walls. The receiving area is preferably delimited on at least 3 sides by walls. One of the walls can especially form a base of the base unit which lies on the wiper blade. In this way, a firm connection of the base unit to the adapter unit that is secured from slipping can be achieved.

The invention further proposes that at least one projection is arranged on at least one wall delimiting the receiving area, said projection forming with the wall a form-fit recess for the abutment of the form-fit element of the adapter unit. A "projection" is particularly to be understood as a second element which is laterally disposed on a first element and the projection of which onto a base on which the first element is disposed at least in part does not overlap a projection of the first element onto the base. A "form-fit recess" is particularly to be understood as a region which is delimited on at least two sides by walls and which is provided for the abutment of a form-fit element corresponding to the shape of the region. A form-fit recess particularly forms a form-fit element. In this way, a form-fit attachment of the adapter unit to the base unit, which is structurally simple and reliable, can particularly be achieved.

The invention further proposes that the form-fit recess has, at least in part, a rounded profile. An "at least in part rounded profile" is particularly to be understood as a profile between at least two walls that delimit the form-fit recess and adjoin one another, said profile being free of sharp edges. An advantageous form fit can thereby be achieved.

The invention further proposes that the detent element is disposed on a side of the receiving area opposite to the form-fit recess. A mounting in a receiving area that is easily performed can thus, in particular, be achieved.

The invention further proposes that the detent element is disposed on a side of the receiving area which is different from a side comprising the form-fit recess and the side opposite the form-fit recess. Thus, an advantageously compact wiper blade device having a small longitudinal extension can particularly be achieved.

The invention further proposes that the detent element is provided to fix the adapter unit in a plane parallel to a wiping plane by means of a detent movement taking place perpendicularly to a main extension direction of the adapter unit. A fixing movement that can be easily performed can thus be achieved.

The invention furthermore proposes a method for mounting a base unit and an adapter unit, in which a form-fit element of the adapter unit is inserted into a form-fit recess of the base unit in a first step and the adapter unit is fixed to the base unit by means of a detent connection in a further step.

BRIEF DESCRIPTION OF THE DRAWINGS

Further advantages ensue from the following description of the drawings. In the drawings, 5 exemplary embodiments of the invention are depicted. The drawings, the description and the claims contain numerous features in combination. The person skilled in the art will also expediently consider the features in isolation and put them together to form useful further combinations.

In the drawings.

DETAILED DESCRIPTION

Figure 1:
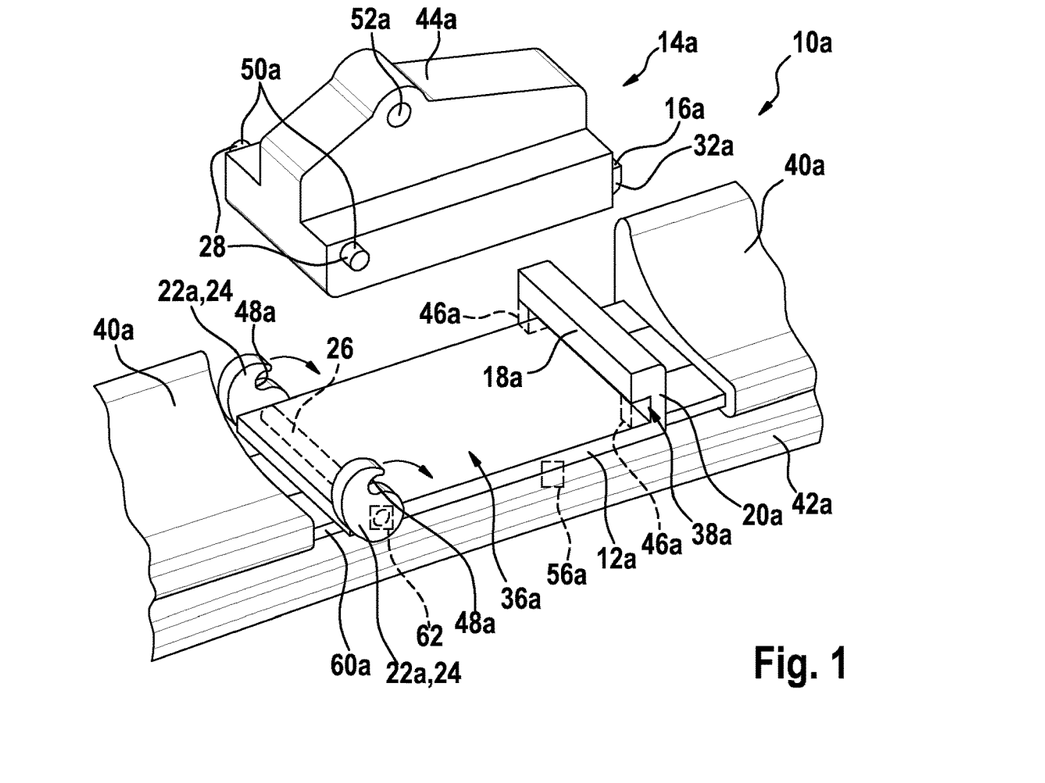
FIG. 1 shows a first exemplary embodiment of the inventive wiper blade device comprising a base unit and an adapter unit which can be connected to a wiper arm, in which the adapter unit is attached to the base unit by means of detent hooks and rounded pins.

FIG. 1 shows a first exemplary embodiment of a wiper blade device 10a comprising a base unit 12a and an adapter unit 14a, which can be connected to a wiper arm and is fixed to the base unit 12a in a form-fitting manner in at least one mounted state, wherein the base unit 12a and the adapter unit 14a have a form-fit connection in the mounted state, in which at least one of the units surrounds the other of the units, at least in part, in a form-fitting manner. The base unit 12a is mounted to a wiper blade 42a, which comprises a wiper blade rubber and a spring strip designed as a spring rail 60a for pretensioning the wiper blade rubber. A window pane of a motor vehicle, which is not depicted, is cleaned with the wiper blade rubber by the wiper blade 42a being moved across the window pane by means of the wiper arm, which is not depicted. A plane which is defined by a bottom side of the wiper blade 42a and bears on the window pane is denoted as the wiping plane. In order to mount the base unit 12a to the wiper blade 42a, the base unit 12a comprises attachment elements, which are designed as gripping claws 56a and surround the spring rail 60a of the wiper blade 42a, on a bottom side, which faces the wiper blade 42a, in the mounted state. The spring rail 60a is made from metal. The base unit 12a can alternatively be mounted to the wiper blade 42a in another way, for example by welding or adhesive bonding.

A wiper spoiler 40a designed as a sloping wall element is mounted to the wiper blade 42a. The spoiler 40a is provided to prevent the wiper blade 42a from being flooded with wiper fluid and thus to especially ensure that the wiper fluid is removed from the window pane during a wiping operation. The wiper spoiler 40a is formed from a wall element that extends in the longitudinal extension direction of the wiper blade 42a and comprises a sloping region that faces a wiper blade main incident flow direction. The sloping region extends asymmetrically as viewed in a transverse direction of the wiper blade 42a. On a side facing the wiper blade main incident flow direction, the sloping region of the wiper spoiler 40a is designed having an initially flat section and a section adjacent thereto having a continually increasing gradient. The section which has the continuously increasing gradient levels off in a crest which defines the highest point of the wiper spoiler 40a above the wiper blade 42a. On a side facing away from the wiper blade main incident flow direction, the wiper spoiler 40a is designed as a steep slope extending at a right angle to the wiping plane. A recess, in which the base unit 12a is mounted on the wiper blade, is formed in the wiper spoiler 40a, so that the wiper spoiler 40a extends along the longitudinal direction of the wiper blade 42a on both sides of the base unit 12a. Components which are not depicted can further be provided to form an arrangement between the wiper spoiler 40a and the wiper blade device 10a in order to limit or prevent wiper fluid from passing through an interstice between wiper blade device 10a and spoiler 40a.

The adapter unit 14a has a substantially cuboid basic shape comprising a base area which is configured as an isosceles and symmetrical trapezoid, wherein a coupling element 44a for the wiper arm is disposed in a central region on the base area. The coupling element 44a is designed as a cuboid element comprising a wedge-shaped raised portion which has a rectangular base area, said cuboid element extending along an entire longitudinal extension of the adapter unit 14a in the central region of the base area of said adapter unit. The wedge-shaped raised portion has a dome in which an attachment means receptacle 52a designed as a circular hole is disposed. The attachment means receptacle 52a is designed for receiving a correspondingly designed attachment means of the wiper arm. In principle, attachment means receptacles 52a having a different shape are also conceivable.

The adapter unit 14a comprises the form-fit element 16a which is surrounded by the base unit 12a in the mounted state. The form-fit element 16a is disposed on a short side of the adapter unit 14a, wherein the short side is tapered in relation to the other short side and is designed as a protruding edge having a rectangular basic shape. In the exemplary embodiment depicted, the form-fit element 16a has right-angled edge regions on the top side and rounded edge regions on the bottom side in a mounted state. The edge regions at the bottom are rounded in order to facilitate a mounting of the adapter unit 14a in the base unit 12a. In principle, the edge regions can however also be completely designed as right angles and/or the form-fit element 16a can have another basic shape, for example a triangular basic shape. The form-fit element 16a is provided to be received in a form-fit recess 38a of the base unit 12a, wherein a shape of the form-fit recess 38a corresponds to a shape of the form-fit element. 16a. Due to the fact that the shapes of the form-fit element 16a and the form-fit recess 38a correspond, the form-fit element 16a provides a clue for the orientation of the adapter unit 14a in order to correctly mount the adapter unit 14a in the base unit 12a and therefore forms an orientation element 32a of the wiper blade device 10a. The adapter unit 14a comprises two rounded pins 28 which are provided for the abutment of a detent element 22a of the base unit 12a. The pins 28 are disposed on a side of the adapter unit 14a that is opposite the form-fit element 16a and are formed from protruding, circularly cylindrical rod elements. Respectively one of the pins 28 is thereby disposed on a long side of the adapter unit 14a, wherein the pins 20 are located in each case opposite one another and laterally protrude beyond the long side of the adapter unit 14a. A lateral surface of the pins 28 serves in each case as a detent contact surface 50a for the abutment of the detent elements 22a.

The base unit 12a comprises a rectangular base area, wherein a length of long and short sides of the base area is in each case greater than a length of respective corresponding long and short sides of the adapter unit 14a. The base unit 12a comprises a receiving area 36a for the adapter unit 14a that is delimited by a wall 20a and is further delimited by the base area of the base unit 12a. The wall 20a delimiting the receiving area 36a is disposed on a short side of the base area. A projection 18a extending in the direction of the receiving area 36a is furthermore disposed in an upper region on the wall 20a delimiting the receiving area 36a, said projection together with the wall 20a forming the form-fit recess 38a for abutting the form-fit element 16a of the adapter unit 14a. The wall 20a delimiting the receiving area 36a further comprises side walls 46a which extend on sides of the wall 20a, which are disposed on the long sides of the base unit 12a, from the projection 18a in a direction parallel to the wiping plane towards the wiper blade 42a up to the long side of the base unit 12a. The side walls 46a are thin with respect to a thickness of the wall 20a and have only a thickness which is a quarter of the thickness of the wall 20a. In principle, the side walls 46a can however also have thicknesses that deviate therefrom and are, for example, embodied just as thick as the wall 20a. The side walls 46a are provided to prevent the adapter unit 14a mounted in the base unit 12a from laterally slipping in a mounted state, in particular as a result of a wiping movement. The wall 20a as well as the side walls 46a is integrally designed with the base area of the base unit 12a. In the example depicted, the base unit 12a has side walls 46a which prevent the adapter unit 14a from laterally slipping. In principle, the side walls 46a can however be integrally formed on the adapter unit 14a and extend laterally along the form-fit element 16a of the adapter unit 14a, wherein, in such a case, a length of the short sides of the base unit 12a is designed shorter than a length of the short side of the adapter unit 14a in order to achieve a form-fitting attachment.

The base unit 12a has detent elements 22a which are provided to fix the adapter unit 14a by means of a detent connection. The detent elements 22a are formed by detent hooks 24 disposed on a side of the receiving area 36a opposite the form-fit recess 38a. The detent hooks 24 are rotatably mounted and are held in a closed state by an elastic element 26. The elastic element 26 is formed from a bar. In principle, the elastic element 26 can however also be formed from another element that appears suitable to a person skilled in the art or can be designed as a non-elastic element for holding the detent elements 22a in a closed position. The elastic element 26 is fixed by means of a fixing unit 62, which is only symbolically depicted and is designed, for example, as a spring-pretensioned detent means which locks in a receiving hole provided therefore after rotating the detent hooks 24 into the closed position. The elastic element is retained in a closed position by means of the fixing unit 62. A release of the detent elements 22a from the closed position is achieved by a release unit that is not depicted; thus enabling the adapter unit 14a to be removed from the base unit 12a. The release unit can, for example, be designed to retract the spring-pretensioned detent means. The bar furthermore achieves a rotatable mounting of the detent hooks 24.

A fixing of the adapter unit 14a by means of the detent elements 22a of the base unit 12, which are designed as detent hooks 24, is achieved by the detent hooks 24 abutting against the rounded pins 28 of the adapter unit 14a. The detent hooks 24 have a substantially circular main body with which said hooks are attached to the rotatably mounted bar which is designed as an elastic element 26. A curved spur protrudes from the main body of the detent hooks 24, the curved region of which facing the main body forms a detent surface 48a. The detent surface 48a has a profile that corresponds to the profile of a quadrant. The detent hooks 24 are disposed at lateral end regions of the side of the receiving area 36a opposite the form-fit recess 38a and abut against the long sides of the base body of the adapter unit 14a in a mounted state of said adapter unit 14a. In principle, it is conceivable in an alternative embodiment for the detent elements 22a designed as detent hooks 24 to be disposed on a side of the receiving area 36a which is different from a side comprising the form-fit recess 38a and the side opposite said form-fit recess 38a, for example on one or both long sides of the base unit 12a. In this alternative embodiment, the adapter unit 14a could, for example, have rounded recesses on the long sides of the base body, said recesses being provided for an abutment of the detent elements 22a designed as detent hooks 24.

In order to assemble the base unit 12a and the adapter unit 14a, a method is used in which the form-fit element 16a of the adapter unit 14a is inserted into the form-fit recess 38a of the base unit in a first procedural step. Because only one of the short sides of the adapter unit 14a comprises a form-fit element 16a, an orientation of the adapter unit 14a during assembly is predetermined by the form-fit element 16a that functions as an orientation element 32a. By inserting the form-fit element of the adapter unit 14a into the form-fit recess 38a of the base unit 12a, a form-fit connection of base unit 12a and adapter unit 14a is achieved, in which the base unit 12a surrounds the adapter unit 14a in part in a form-fitting manner. Due to the rounded configuration of the lower region of the form-fit element 16a, an insertion of the adapter unit 14a into the base unit 12a is easier to carry out. In a further procedural step, the adapter unit 14a is fixed in a form-fitting manner to the base unit 12a by means of a detent connection after inserting the form-fit element 16a into the form-fit recess 38a. To this end, the detent hooks 24 are rotated by hand so that a hook recess of the detent hooks 24 surrounds the rounded pins 28 of the long sides of the adapter unit 14a, wherein the detent surfaces 48a of the detent hooks 24 abut against the lateral surfaces of the rounded pins 28 which form the detent contact surfaces 50a. The elastic element 26 can alternatively be designed as a torsion bar and, when inserting the adapter unit 14a into the base unit 12a, the detent hooks 24 are deflected in a rotatory manner in a direction oriented away from the receiving area 36a by means of a strike from above. By means of a deflection in the direction oriented away from the receiving area 36a, the elastic element 26 designed as a torsion bar is twisted, whereby an elastic torsional force is generated which deflects the detent hooks 24 in a rotatory manner in a direction oriented towards the receiving area 36a and brings the detent hooks 24 into abutment with the rounded pins 28 of the adapter unit 14a.

In FIGS. 2-9, further exemplary embodiments of the invention are depicted. The following descriptions are limited substantially to the differences between the exemplary embodiments, wherein, with regard to uniform components, features and functions can refer to the description of the other exemplary embodiment. In order to differentiate the exemplary embodiments, the letter a in the reference signs of the first exemplary embodiment in FIG. 1 is replaced by the letters b-f in the reference signs of the further exemplary embodiments of FIGS. 2-9. With regard to identically referenced components, in particular with regard to components having identical reference signs, reference is basically made to the drawings and/or the description of the exemplary embodiment of FIG. 1.

Figure 2:
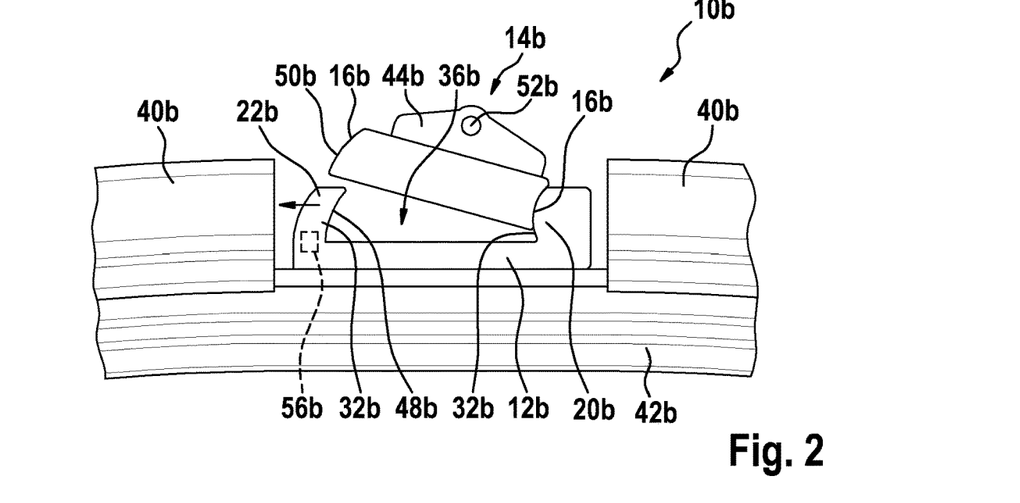
FIG. 2 shows a second exemplary embodiment of the inventive wiper blade device, in which the adapter unit is attached to the base unit via a form-fit element that is of round configuration.

An alternative wiper blade device 10*b* is depicted in FIG. 2. The base unit 12*b* is disposed in an interstice between the wiper spoiler 40*b* and the wiper blade 42*b* and is fastened by means of gripping claws 56*b* on the spring rail 60*b* of the wiper blade 42*b*. The wiper spoiler 40*b* is designed analogous to the wiper spoiler 40*a* depicted in the first exemplary embodiment.

The base unit 12*b* has a rectangular basic shape comprising respectively two long and short sides. A base area of the base unit 12*b* is configured for contact with a region of the adapter unit 14*b* that lies opposite the coupling element 44*b* to the wiper arm and has a shape corresponding to said region. The base unit 12*b* has walls 20*b* on both short sides of the basic shape, which delimit a receiving area 36*b* for the adapter unit 14*b*. A longitudinal extension of the receiving area 36*b* coincides with a longitudinal extension of a base body of the adapter unit 14*b*. The walls 20*b* of the base unit 12*b* are furthermore designed as contact surfaces for form-fit elements 16*b* of the adapter unit 14*b*. One of the walls 20*b* has a rounded configuration comprising a rounded protrusion extending in the direction of the receiving area 36*b*. The protrusion is of hemispherical design and is designed for abutting a correspondingly designed form-fit element 16*b* of the adapter unit 14*b*. The other wall 20*b* has an indentation which extends in a direction oriented away from the receiving area 36*b* and forms a form-fit recess 38*b*. The form-fit recess 38*b* is delimited by a hemispherical run of the wall 20*b* which is indented towards the inside. The protrusion and the indentation of the walls 20*b* correspond to one another. In so doing, it is to be understood that, when the protrusion is truncated and the truncated protrusion is inserted into the indentation, the protrusion fills the indentation in such a manner that a wall is maintained which runs perpendicularly. The form-fit recess 38*b* therefore has a rounded profile. In principle, the walls 20*b* can also have configurations that do not correspond with one another. In addition, configurations of the walls can also deviate from a rounded configuration and have, for example, angular edges. The wall 20*b* which has the indentation that extends in the direction oriented away from the receiving area 36*b* is designed as a detent element 22*b* which is provided to fix the adapter unit 14*b* by means of a detent connection. The detent element 22*b* formed from the wall 20*b* can be elastically deformed and is manufactured from an elastomer material. The detent element 22*b* can be elastically deflected in a direction oriented away from the receiving area 36*b* by applying force, wherein a force applied by a human hand is sufficient, and returns back to an original position after the application of force has ended.

The adapter unit 14*b* has a base body having a cylindrical basic shape. The longitudinal extension of the base body coincides with a longitudinal extension of the receiving area 36*a*. The coupling element 44*b* for the wiper arm is disposed on a top side of the adapter unit 14*b*. End regions of the cylindrical basic shape are designed as form-fit elements 16*b* of the adapter unit 14*b* which are of round configuration. The form-fit elements 16*b* have in each case a configuration which corresponds to the protrusion or indentation of the walls 20*b* and are therefore embodied as a hemispherical protrusion or indentation. The wiper blade device 10*b* further comprises orientation elements 32*b* which are formed by the form-fit elements 16*b* of the adapter unit 14*b* and the walls 20*b*. As a result of a profile of the walls 20*b* of the base unit 12*b* and the corresponding form-fit elements 16*b* of the adapter unit 14*b*, a clue is provided for the orientation of the adapter unit 14*b* in order to correctly mount the base unit 12*b* and the adapter unit 14*b*.

In order mount the wiper blade device 10*b*, the adapter unit 14*b* comprising the end region of the cylindrical basic shape, which has the form-fit element 16*b* configured as an indentation, is applied to the wall 20*b* opposite the detent element 22*b*. The elastically deformable detent element 22*b* is subsequently deflected from a resting position into a direction oriented away from the receiving area 36*b* by applying force, and the adapter unit 14*b* is moved towards the wiper blade 42*b*; thus enabling the region of the adapter unit 14*b* opposite the coupling region for the wiper arm to be received in the base unit 12*b*. In a further step, a relaxation of the detent element 22*b* into the resting position takes place; thus enabling the detent element 22*b* to come to rest against the form-fit element 16*b* of the adapter unit 14*b*, which is configured as a protrusion. In so doing, a detent connection is produced. The adapter unit 14*b* is thus fixed by means of the detent connection. The adapter unit 14*b* is surrounded by the base unit 12*b* in part in a form-fitting manner by means of an abutment of the form-fit elements 16*b* of the adapter unit 14*b* against the walls 20*b* of the base unit 12*b* and a configuration of the form-fit elements 16*b* and the corresponding walls 20*b* as protrusions and indentations.

Figure 3:
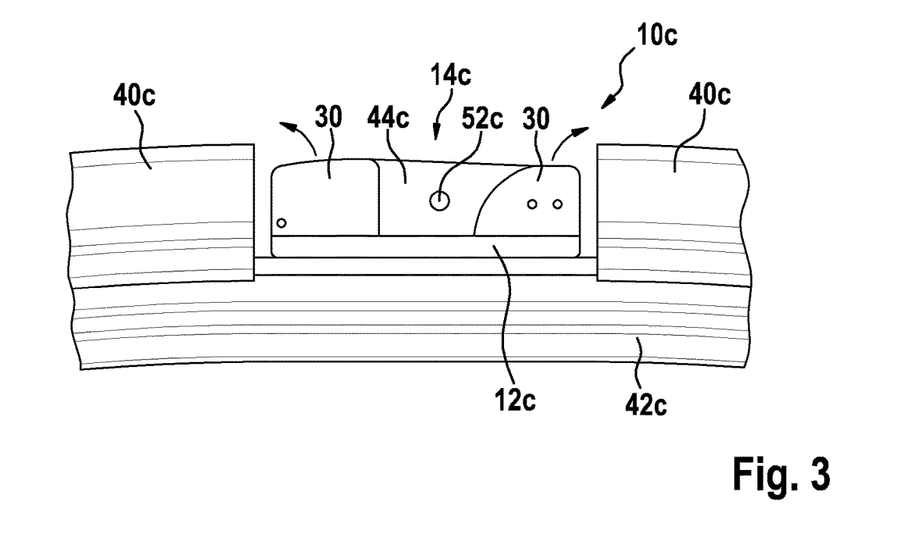
FIGS. 3-4 shows a detailed view of the attachment of the adapter unit comprising folding elements for attachment to a wiper arm.
Figure 4:
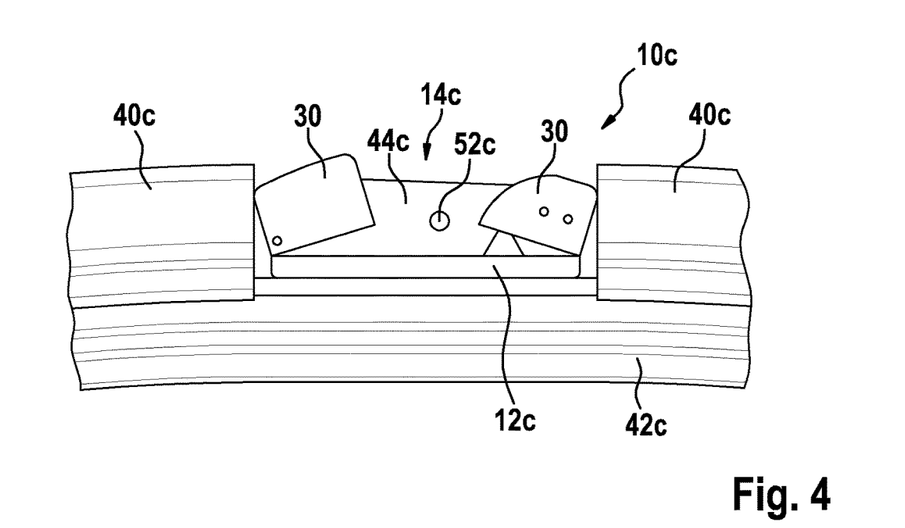

FIG. 3 shows a side view of a wiper blade device 10*c* comprising an adapter unit 14*c* that has folding elements 30 which are provided to attach the wiper arm to the adapter unit 14*c*. The folding elements 30 can be pivoted to the open position (FIG. 4) and attach the wiper arm to the adapter unit 14*c*. For attachment purposes, the wiper arm is coupled to the coupling element 44*c* when the folding elements 30 are folded up and is fastened by folding down the folding elements 30. To this end, the folding elements 30 comprise form-fit regions (not depicted) for a form-fitting attachment of the wiper arm.

Figure 5:
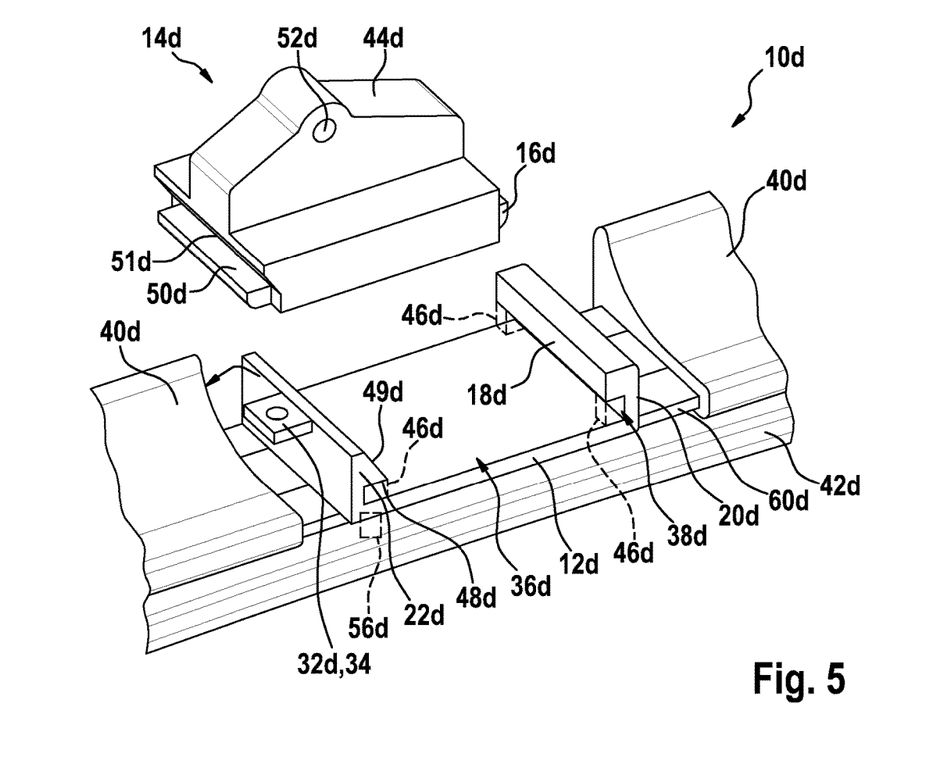
FIG. 5 shows a third exemplary embodiment of the invention, in which the adapter unit is attached by means of a detent element of the base unit and an eyelet is provided as a visual reference element for ensuring a directionally correct installation.

A further exemplary embodiment of the invention is depicted in FIG. 5. The wiper blade device 10*d* comprises a base unit 12*d*, which is mounted in a known manner by means of gripping claws 56*d* to the spring rail 60*d* of the wiper blade 42*d* in a recess of the wiper spoiler 40*d*. The base unit 12*d* has a rectangular basic shape comprising two long and two short sides, wherein two walls 20*d* are disposed on the short sides, said walls delimiting the receiving area 36*d* for the adapter unit 14*d*. A projection is 18*d* is disposed on one of the walls 20*d*, said projection protruding in a direction towards the receiving area 36*d* to a base area of the base unit 12*d* and with the wall 20*d* forming a form-fit recess 38*d*, which is provided for abutting the form-fit element 16*d* of the adapter unit 14*d*. A detent element 22*d* is disposed on the other wall 20*d*. Said detent element is elastically deformable and is provided to engage in a recess on a side of the adapter unit 14*d* facing away from the from-fit element 16*d* and to fix the adapter unit 14*d* to the base unit 12*d*. In addition, the wall 20*d* comprising the detent element 22 is designed in an elastically deformable manner. The detent element 22*d* is wedge-shaped and has two side regions which converge at an angle of 45 degrees. One of the side regions extends parallel to the base area of the base unit 12*d* which forms a surface of the receiving area 36*d* and forms a detent surface 48*d*. The other side region extends at an angle of 45 degrees to the detent surface 48*d* and forms a second detent surface 49d. The walls 20d have side walls 46d at the lateral ends thereof, which are provided to prevent the adapter unit 14d from slipping sideward out of the base unit 12d in the mounted state. In addition, the side walls 46d prevent the passage of wiper fluid at a connection point between the base unit 12d and the adapter unit 14d.

An orientation element 32d designed as a visual reference element 34 is furthermore disposed on a side facing away from the receiving area 36d on the wall 20d which comprises the detent element 22d. The visual reference element 34 is designed as an eyelet in a rectangular extension of the wall 20d and provides a visual clue for an orientation of the adapter unit 14d for proper mounting.

The adapter unit 14d has a form-fit element on a short side, said element being provided for abutting against the form-fit recess 38d and is surrounded in the mounted state by the projection 18d and the wall 20d of the base unit 12d. The form-fit element 16d is designed in the shape of a substantially rectangular protruding edge, the region at the bottom of which is rounded in the mounted state. An insertion of the adapter unit 14d into the base unit 12d is facilitated by the partially rounded configuration of the form-fit element 16d. A recess, which is provided for a form-fitting accommodation of the wedge-shaped detent element 22d, is disposed on a side of the adapter unit 14d opposite the form-fit element 16d. To this end, the recess comprises a detent contact surface 50d that extends parallel to a base area of the adapter unit 14d and a detent contact surface 51d extending, based on a line of sight from the recess to the form-fit element 16d, at an angle of 135 degrees to the base area of the adapter unit 14d. The detent contact surface 50d is provided for abutting the detent surface 48d and the detent contact surface 51d for abutting the detent surface 49d.

In order to mount the adapter unit 14d in the base unit 12d, the form-fit element 16d of the adapter unit 14d is inserted into the form-fit recess 38d of the base unit 12d in a first procedural step. The insertion is facilitated by means of the partially rounded configuration of the form-fit element. To this end, the wall 20d comprising the elastically deformable, wedge-shaped detent element 22d is bent in the direction that is oriented away from the receiving area 36d while applying a bending force. In a further procedural step, the wall 20d comprising the detent element 22d is allowed to return to an original position, whereby the detent element 22d comprising the detent surfaces 48d, 49d engages in the recess of the adapter unit 14d comprising the detent contact surfaces 50d, 51d and fixes the adapter unit 14d in a form-fitting manner. The detent element 22d is therefore provided to fix the adapter unit 14d in a plane parallel to the wiping plane with a detent movement that takes place perpendicularly to a main extension direction of the adapter unit 14d. The main extension direction of the adapter unit 14d is formed by an orientation of the long sides of the basic shape of the adapter unit 14d.

Figure 6:
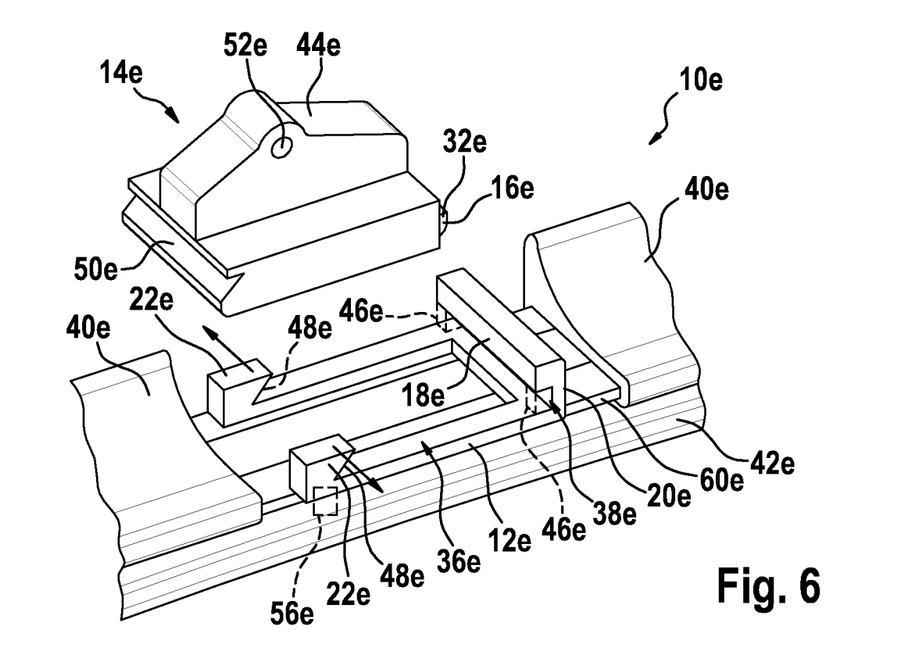
FIGS. 6-7 shows a fourth exemplary embodiment of the invention comprising detent elements on the base unit, which are disposed on a side comprising a form-fit recess.

A further exemplary embodiment of the invention is depicted in FIG. 6. Base unit 12e and adapter unit 14e are substantially analogous to the preceding exemplary embodiment. In contrast to the preceding exemplary embodiment, the base unit 12e has two detent elements 22e which are wedge-shaped. The detent elements 22e are disposed at the ends of two lateral rail bodies. A cross rail, on which a wall 20e comprising a projection 18e, which together with the wall 20e forms the form-fit recess 38e, is disposed, is arranged at ends of the rail bodies which face away from detent elements 22e. The detent elements 22e and the rail bodies are designed in an elastically deformable manner; thus enabling the detent elements 22e to be deflected out of a resting position into a direction oriented transversely away from a longitudinal extension of the receiving area 36e. The detent elements 22e have in each case an edge rising at an angle of 45 degrees from the base area of the rail bodies, based on a line of sight onto the form-fit recess 38e. The edges of said detent elements 22e form a detent surface 48e with the sides thereof which face the rail body. The detent surfaces 48e are provided for abutting a detent contact surface 50e of the adapter unit 14e. After the detent elements 22e have been deflected and the adapter unit 14e has been inserted into the receiving area 36e of the base unit 12e, the detent elements 22e move elastically back into the resting position.

Figure 7:
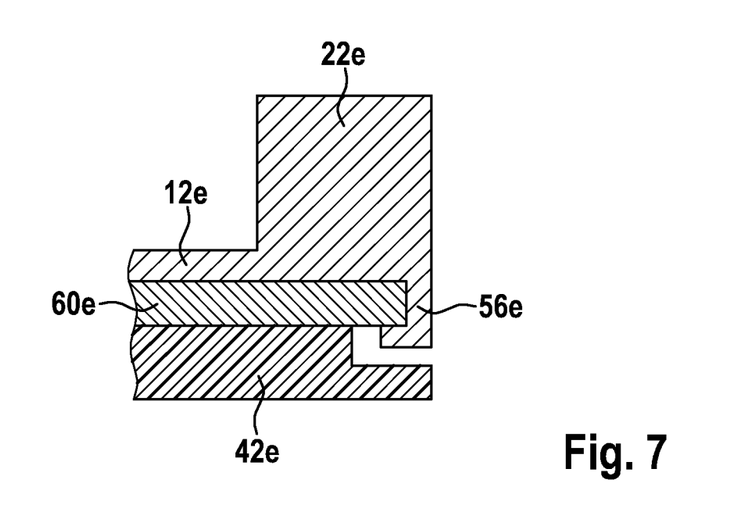

FIG. 7 shows a cross section through a profile of the base unit 12e comprising a detent element 22e and a gripping claw 56e attached to the spring rail 60e of the wiper blade 42e. The gripping claw 56e prevents a lateral slippage of the base unit 12e and the attached adapter unit 14e during a wiping movement.

Figure 8:
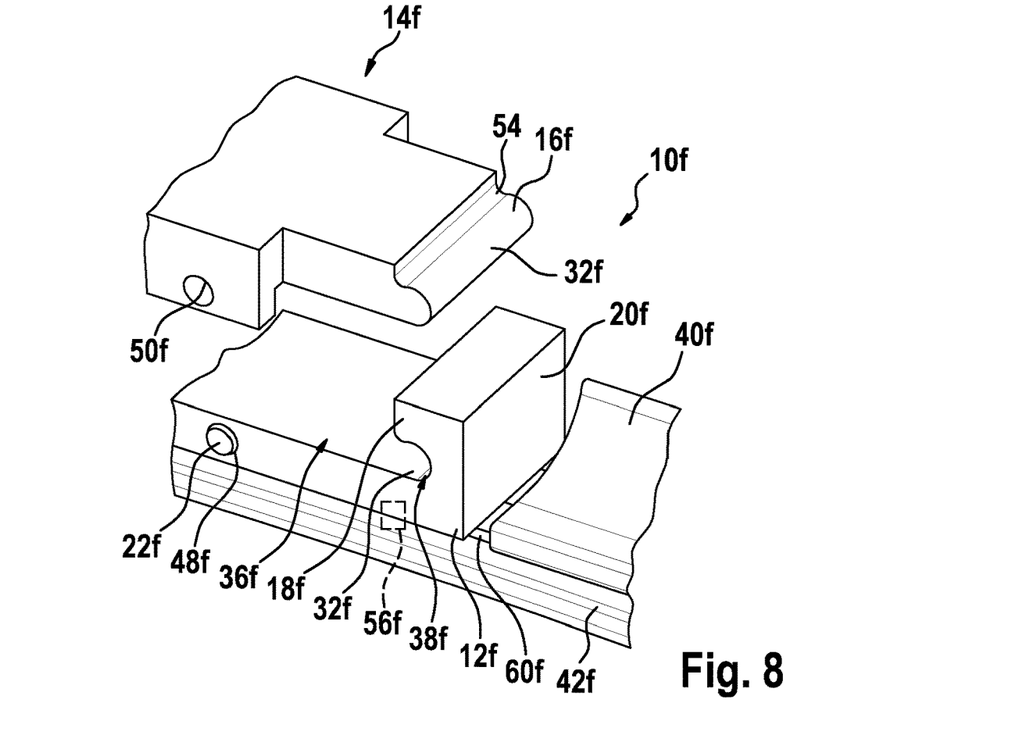
FIGS. 8-9 shows a fifth exemplary embodiment of the invention, in which the adapter unit comprises a form-fit element which is designed as a rounded projection and is provided to be received in a corresponding form-fit recess of the base unit.

FIG. 8 shows a partial section of a further exemplary embodiment of the invention. A side region of the base unit 12f and the adapter unit 14f comprising the form-fit element 16f is depicted from the wiper blade device 10f. The base unit 12f has a rectangular basic shape, wherein a wall 20f is disposed on a short side, said wall together with a projection 18f forming a form-fit recess 38f having a cross section extending in the shape of a hemisphere. The form-fit recess 38f is provided for receiving the form-fit element 16f of the adapter unit 14f. A detent element 22f designed as a knob having a circular cross section is disposed at a side region of a long side of the base unit 12f. The detent element 22f is therefore disposed on a side of the receiving area 38f which is different from the side comprising the form-fit recess 38f and the side opposite the form-fit recess 38f. The detent element 22f is provided to lock in a circular recess of the adapter unit 14f.

The adapter unit 14f comprises a rectangular base body, on which a protruding form-fit element 16f with a hemispherical cross section is disposed in a front region. The form-fit element 16f is separated from an upper region of the adapter unit 14f by a rounded shoulder 54. The wiper blade device 10f comprises orientation elements 32f which are designed as the form-fit element 16f of the adapter unit 14f and the form-fit recess 38f of the base unit 12f. An edge comprising a circular recess is disposed at a lateral region of the base body of the adapter unit 14f, wherein the edge protrudes downwards beyond the base body of the adapter unit 14f, in a direction oriented away from a coupling region of the wiper arm. The circular recess in the edge forms a detent contact surface 50f.

In order to mount the base unit 12f and the adapter unit 14f, the adapter unit 14f is inserted from above into the receiving area 36f of the base unit 12f and the form-fit element is inserted into the form-fit recess 38f from the side with a movement directed towards the form-fit recess 38f. A region of the adapter unit 14f facing away from the form-fit element 16f is thereby held in an elevated position above the receiving area 36f. In a succeeding assembly step, the region of the adapter unit 14f facing away from the form-fit element 16f is moved downwards and, in so doing, the circular recess of the adapter unit 14f is pulled over the detent element 22f. By means of lateral pressure, the detent element is now pressed into the circular recess, whereby detent surfaces 48f formed by side regions of the detent element 22f come to rest against the detent contact surfaces 50f of the circular recess, and the adapter unit 14f is fixed in the base unit 12f. A safeguard against a lateral slippage of the mounted adapter unit 14f during a wiping movement is provided by a use of additional locking pins 58.

Figure 9:
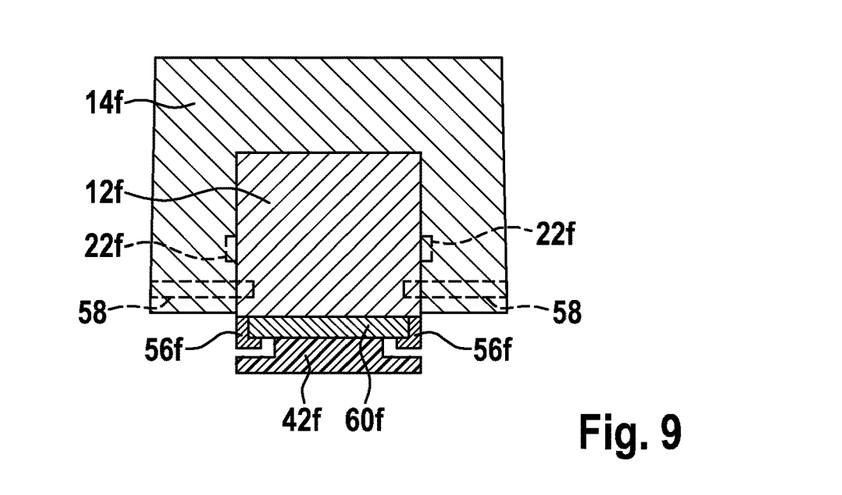

FIG. 9 shows a cross section through a mounted wiper blade device 10f comprising a detent element 22f inserted into the circular recess.

What is claimed is:

1. A wiper blade device comprising a base unit (12a-f) and an elongated adapter unit (14a-f) defining opposite ends spaced along a longitudinal direction, the adapter unit being configured to be connected to a wiper arm and being fixed to the base unit (12a-f) in a form-fitting manner in at least one mounted state, wherein the base unit (12a-f) and the adapter unit (14a-f) have a form-fit connection in the mounted state, in which at least one of the base unit and the adapter unit surrounds the other of the base unit and the adapter unit, at least in part, in a form-fitting manner, wherein the base unit (12a-b, 12d-e) includes a detent element (22a-b, 22d-e) which is configured to fix the adapter unit (14a-b, 14d-e) to the base unit (12a-f) by a detent connection, wherein the detent element (22a) is a substantially planar detent hook (24a) defining a plane and having a continuous peripheral edge, said hook rotatably mounted to a portion of the base unit (12a-b, 12d-e) about a fixed rotation axis extending perpendicular to the plane, through the hook and spaced from the edge, such that the entire detent hook (24) rotates about the fixed rotation axis during rotational movement of the detent hook (24), and such that the detent hook rotates in a purely rotational movement about the fixed rotation axis during an entire range of motion of the detent hook, the adapter unit comprises at least one form-fit element which is, at least in part, surrounded by the base unit, said form-fit element extending longitudinally away from one end of the adapter unit in the longitudinal direction.

2. The wiper blade device according to claim 1, characterized in that the form-fit element (16a-b, 16d-f) of the adapter unit (14a-b, 14d-f) is at least partially rounded.

3. The wiper blade device according to claim 1, characterized in that the adapter unit (14a) has at least one rounded pin (28) which is configured to abut the detent element (22a).

4. The wiper blade device at least according to claim 1, characterized in that the detent hook (24) is held in a closed state by an elastic element (26).

5. The wiper blade device according to claim 4, wherein the elastic element (26) is a torsion bar, and wherein the detent hook is coupled to an end of the torsion bar.

6. The wiper blade device at least according to claim 1, further comprising at least one orientation element (32a-b, 32d-f).

7. The wiper blade device at least according to claim 6, characterized in that the orientation element (32a-b, 32d-f) is the form-fit element (16a-b, 16d-f) of the adapter unit (14a-b, 14d-f).

8. The wiper blade device at least according to claim 1, characterized in that the base unit (12a-b, 12d-f) comprises a receiving area (36a-b, 36d-f) receiving the form-fit element therein, said receiving area being delimited by at least one wall (20a-b, 20d-f).

9. The wiper blade device according to claim 8, characterized in that at least one projection (18a-b, 18d-f) is disposed on the at least one wall (20a-b, 20d-f) that delimits the receiving area (36a-b, 36d-f), said projection forming with the wall (20a-b, 20d-f) a form-fit recess (38a-b, 38d-f) for abutting the form-fit element (16a-b, 16d-f) of the adapter unit (14a-b, 14d-f).

10. A method for mounting a wiper blade device according to claim 9, the method comprising inserting the form-fit element (16a-b, 16d-f) of the adapter unit (14a-b, 14d-f) into the form-fit recess (38a-b, 38d-f) of the base unit (12a-b, 12d-f) in a first procedural step, and fixing the adapter unit (14a-b, 14d-f) to the base unit (12a-b, 12d-f) in a form-fitting manner by the detent connection in a further procedural step.

11. The wiper blade device according to claim 1, characterized in that the base unit (12a-b, 12d-f) comprises a receiving area (36a-b, 36d-f) for the adapter unit (14a-b, 14d-f), said receiving area being delimited by at least one wall (20a-b, 20d-f), wherein at least one projection (18a-b, 18d-f) is disposed on the at least one wall (20a-b, 20d-f) that delimits the receiving area (36a-b, 36d-f), said projection forming with the wall (20a-b, 20d-f) a form-fit recess (38a-b, 38d-f) for abutting the form-fit element (16a-b, 16d-f) of the adapter unit (14a-b, 14d-f), and wherein the detent element (22a, 22d-f) is disposed on a side of the receiving area (36a, 36d-f) that is opposite the form-fit recess (38a, 38d-f).

12. The wiper blade device according to claim 1, characterized in that the base unit (12a-b, 12d-f) comprises a receiving area (36a-b, 36d-f) for the adapter unit (14a-b, 14d-f), said receiving area being delimited by at least one wall (20a-b, 20d-f), wherein at least one projection (18a-b, 18d-f) is disposed on the at least one wall (20a-b, 20d-f) that delimits the receiving area (36a-b, 36d-f), said projection forming with the wall (20a-b, 20d-f) a form-fit recess (38a-b, 38d-f) for abutting the form-fit element (16a-b, 16d-f) of the adapter unit (14a-b, 14d-f), and wherein the detent element (22a, 22d-e) is disposed on a side of the receiving area (36a, 36d-e) which is different from a side comprising the form-fit recess (38a, 38d-f) and a side opposite the form-fit recess (38a, 38d-f).

13. A wiper blade comprising a wiper blade device (10a-f) according to claim 1.

14. A windshield wiper comprising at least one wiper blade (42a-f) according to claim 13 and comprising the wiper arm connected to the adapter unit.

15. The wiper blade device according to claim 1, wherein the detent element includes two detent hooks (27) that each rotate about the same fixed rotation axis, and are spaced apart from one another on opposite sides of the base unit (12a).

16. The wiper blade device according to claim 1, wherein the fixed rotation axis extends through a portion of the base unit and through the detent element.

17. The wiper blade device according to claim 1, wherein a portion of the detent hook (24) is configured to rotate over a top of a portion of the adapter unit (14a) in the mounted state, the top of the portion of the adapter unit (14a) facing away from the base unit (12a-f).

* * * * *